United States Patent
Gygi et al.

(10) Patent No.: US 6,986,083 B2
(45) Date of Patent: Jan. 10, 2006

(54) METHOD AND/OR APPARATUS FOR SCSI TARGET VERIFICATION

(75) Inventors: Carl E. Gygi, Colorado Springs, CO (US); Mark A. Slutz, Colorado Springs, CO (US); Stuart L. Nuffer, Elbert, CO (US)

(73) Assignee: LSI Logic Corporation, Milpitas, CA (US)

( * ) Notice: Subject to any disclaimer, the term of this patent is extended or adjusted under 35 U.S.C. 154(b) by 458 days.

(21) Appl. No.: 10/122,580

(22) Filed: Apr. 15, 2002

(65) Prior Publication Data

US 2003/0196149 A1  Oct. 16, 2003

(51) Int. Cl.
*G11C 29/00* (2006.01)

(52) U.S. Cl. ..................................... 714/719
(58) Field of Classification Search ............... 714/718, 714/719, 720, 712, 724, 733, 748, 749
See application file for complete search history.

(56) References Cited

U.S. PATENT DOCUMENTS 6,442,628 B1 * 8/2002 Bastiani et al. ............... 710/60

* cited by examiner

*Primary Examiner*—Albert Decady

*Assistant Examiner*—James C. Kerveros

(74) *Attorney, Agent, or Firm*—Christopher P. Maiorana, P.C.

(57) ABSTRACT

A method for data verification in a data storage environment including the steps of (A) sending a command from an initiator to a target, where the command defines an expected data pattern, (B) sending a block write command from the initiator to the target, where the write command initiates sending data from the initiator to the target, (C) comparing data received to the expected data pattern and (D) generating a status indication in response to the comparison.

19 Claims, 3 Drawing Sheets

METHOD AND/OR APPARATUS FOR SCSI TARGET VERIFICATION

FIELD OF THE INVENTION

The present invention relates to SCSI devices generally and, more particularly, to a method and/or apparatus for SCSI target verification.

BACKGROUND OF THE INVENTION

Verifying the integrity of the data sent by a Small Computer System Interface (SCSI) is important when testing a hardware SCSI protocol controller. Currently SCSI initiators can verify that data is written to a SCSI target by using a SCSI write block command to a Logical Block Address (LBA) with a fixed data pattern. A SCSI read block command is then implemented to read the same LBA and compare the value read from the LBA with the original data pattern. However, if the data miscompares, the initiator does not know whether the data sent on the SCSI bus was incorrect during the SCSI write block command or the data on the SCSI bus was incorrect during the SCSI read block command. Data sent incorrectly during the SCSI write block command would indicate the SCSI initiator was at fault for the miscompare. Data sent incorrectly during the SCSI read block command would indicate the SCSI target was at fault for the miscompare.

Conventional solutions to such problems capture both transactions on a logic analyzer and visually inspect the data transferred on both transactions. Such conventional approaches demand a large amount of time, analyzer equipment and protocol expertise to interpret the data.

It would be desirable to implement a method and/or apparatus for SCSI target verification that reduces time, equipment, and personnel resources when compared with conventional approaches.

SUMMARY OF THE INVENTION

The present invention concerns a method for data verification in a data storage environment comprising the steps of (A) sending a command from an initiator to a target, where the command defines an expected data pattern, (B) sending a block write command from the initiator to the target, where the write command initiates sending data from the initiator to the target, (C) comparing data received to the expected data pattern and (D) generating a status indication in response to the comparison.

The objects, features and advantages of the present invention include providing a target verification (e.g., a SCSI target verification) that may (i) use in-band diagnosing of data integrity issues between SCSI initiators and SCSI targets for validating the functionality of a SCSI protocol controller, and/or (ii) be implemented while saving time, equipment, and personnel resources.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
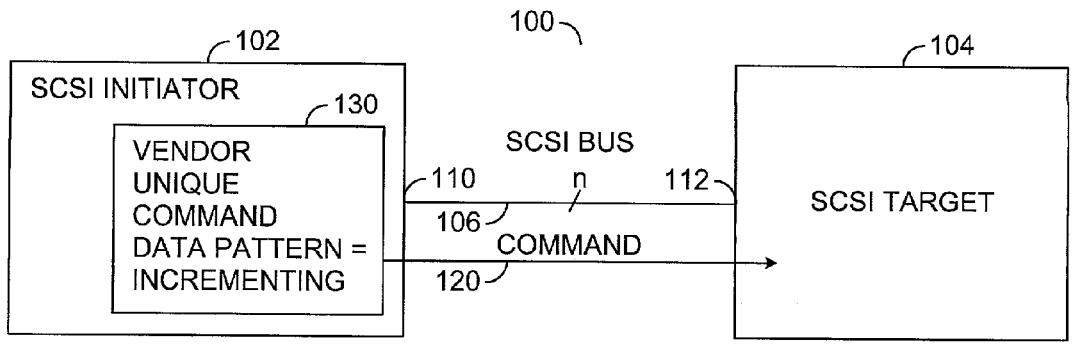
FIG. 1 is a diagram illustrating a step of the present invention.

Referring to FIG. 1, a block diagram of a system 100 is shown in accordance with a preferred embodiment of the present invention. The system 100 generally comprises an initiator block (or circuit) 102 and a target block (or circuit) 104. The initiator 102 may be implemented as a Small Computer Systems Interface (SCSI) initiator. The target 104 may be implemented as a SCSI target. The circuit 102 may be connected to the circuit 104 through a bus 106. The bus 106 may be implemented as a SCSI bus. A SCSI bus 106 may be connected between an output 110 of the SCSI initiator 102 and an input 112 of the SCSI target 104. The SCSI bus 106 is generally implemented as a multi-bit bus. A signal (e.g., COMMAND) is shown transmitted on a line 120. While the line 120 is shown individually for clarity, the line 120 is generally an exploded view of one of one or more particular lines of the SCSI bus 106.

In general, the system 100 implements a number of vendor unique commands sent from the SCSI initiator 102 to the SCSI target 104 (e.g., as the signal COMMAND). Notification of an expected data pattern that corresponds to the SCSI block command may be sent with such a command. The notification generally allows the SCSI target 104 to verify the data as the data is written. The SCSI target 104 then notifies the SCSI initiator 102 through a vendor unique status command (or signal) if the SCSI target 104 received the data incorrectly. Such notification will allow the initiator 102 to automatically differentiate, in band, between data errors occurring in either the SCSI initiator 102 or the SCSI target 104.

In SCSI applications, most of the opcodes are reserved by the SCSI specification for standard operations defined within the specification. Example SCSI specifications include the following approved standards and their designations: (i) SCSI Parallel Interface-2 (SPI-2) [X3.302:1998], (ii) SCSI Parallel Interface-3 (SPI-3) [NCITS.336:2000], (iii) SCSI Primary Commands-2 (SPC-2) [NCITS.351:2001], (iv) Reduced Block Commands (RBC) [NCITS.330:2000], (v) SCSI Controller Commands-2 (SCC-2) [NCITS.318:1998], (vi) SCSI-2 Common Access Method Transport and SCSI [X3.232:1996 [R2001]], (vii) Interface Module, (viii) SCSI-3Architecture Model (SAM) [X3.270:1996 [R2001]], (ix) SCSI-3 Block Commands (SBC) [NCITS.306:1998], (x) SCSI-3 Primary Commands (SPC) [X3.301:1997], (xi) Small Computer System Interface-2 (SCSI-2) [X3.131:1994 [1999]], and the following draft standards and their designation and version numbers: (i) SCSI Architecture Model-2(SAM-2) [1157-D Development 23], (ii) SCSI Block Commands-2 (SBC-2) [1417-D Development 05a], (iii) SCSI Enclosure Services-2(SES-2) [1559-D Development_], (iv) SCSI Fibre Channel Protocol-2 (FCP-2) [1144-D INCITS Approval 07a], (v) SCSI Management Server Commands (MSC) [1528-D Development_], (vi) SCSI Medium Changer Commands-2 (SMC-2) [1383-D Development 04], (vii) SCSI Parallel Interface-4 (SPI-4) [1365-D INCITS approval 09], (viii) SCSI Parallel Interface-5 (SPI-5) [1525-D Development_], (ix) SCSI Passive Interconnect Performance [1439-D Development 01], (x) (PIP), (xi) SCSI Primary Commands-3 (SPC-3) [1416-D Development 05], the appropriate sections of which are incorporated by reference in their entirety.

However, a section of opcodes are reserved for unique applications that a vendor may want to implement outside of the SCSI specification. The vendor unique commands described in connection with the present invention includes the use of such commands. Examples of such commands may include a "set data pattern" command, a "set custom data pattern" command and a "get write status information" command.

The set data pattern command may be used to notify the SCSI target 104 of the data pattern that is going to be sent by the SCSI initiator 102. There is no data transferred for this command. An example of a set data pattern command is shown by the following table and description:

| | |
|---|---|
| 0 | Vendor Unique Op Code 0xEA |
| 1 | Pattern Type MSB |
| 2 | Pattern Type |
| 3 | Pattern Type |
| 4 | Pattern Type LSB |
| 5 | Pattern Scale Size |
| 6 | Reserved |
| 7 | Reserved |
| 8 | Reserved |
| 9 | Reserved |
| 10 | Reserved |
| 11 | Reserved |

Pattern Types:

0x00000000 Incrementing
0x00000001 Decrementing
0x00000002 Alternating 5/A
0x00000003 Alternating 0/F
0x00000004 Shifting 1
0x00000005 Shifting 0
0x00000006 Butterfly Pattern Scale Sizes:

0x08 8 bit pattern
0x10 16 bit pattern
0x20 32 bit pattern
0x40 64 bit pattern

The set custom data pattern command may be used to notify target 104 of the data pattern that is going to be sent by CSI initiator 102. A DATA_OUT phase generally follows this nd and the data transferred will be the custom pattern. An example of a set custom data pattern command is shown by the following table:

| | |
|---|---|
| 0 | Vendor Unique Op Code 0xEB |
| 1 | Pattern Length MSB |
| 2 | Pattern Length |
| 3 | Reserved |
| 4 | Reserved |
| 5 | Reserved |
| 6 | Reserved |
| 7 | Reserved |

-continued

| | |
|---|---|
| 8 | Reserved |
| 9 | Reserved |
| 10 | Reserved |
| 11 | Reserved |

The get write status information command may be used to notify the SCSI target 104 of the data pattern. A DATA_OUT phase generally follows this command and the data transferred will generally be the custom pattern. The get write status command generally retrieves extended error information from a SCSI target 104 after the device indicated a check condition with sense key WRITE_DATA_PATTERN_MISCOMPARE. An example of a get write status information is shown by the following table:

| | |
|---|---|
| 0 | Vendor Unique Op Code 0xEC |
| 1 | Max Error Information Data Length MSB |
| 2 | Max Error Information Data LSB |
| 3 | Reserved |
| 4 | Reserved |
| 5 | Reserved |
| 6 | Reserved |
| 7 | Reserved |
| 8 | Reserved |
| 9 | Reserved |
| 10 | Reserved |
| 11 | Reserved |

The set data pattern command, the set custom data pattern command and the get write status information command are examples of particular vendor unique commands that may be used in the context of the present invention. Other examples and/or modifications may be used to meet the design criteria of a particular implementation.

The system 100 may allow in-band diagnosing of data integrity issues between the SCSI initiator 102 and the SCSI target 104 for the purpose of validating SCSI functionality of a SCSI protocol controller. While the term SCSI target 104 is used in a singular sense throughout the description of the present invention, multiple SCSI targets 104 are contemplated within the scope of the present invention. Similarly, multiple SCSI initiators 102 are also contemplated within the scope of the present invention.

The present invention may also be used to validate the functionality of data movement within a particular SCSI target 104. For example, data movement from a cache (e.g., a memory such as an SRAM or other appropriate code memory) to the actual storage medium (e.g., a memory such as a main memory, a hard disk drive, etc.) may be tested, since the expected data pattern is generally known (e.g., fixed, predetermined, etc.).

FIG. 1 generally illustrates a step (e.g., Step 1) where the SCSI initiator 102 generally sends (presents) a command (e.g., a Vendor Unique Command) 130. The circuit 104 may be configured to present the data pattern command 130 to the circuit 104 through the bus segment 120 of the bus 106 (e.g., as the signal COMMAND). The command 130 (e.g., a "set data pattern" command or a "set custom data pattern" command) may define (e.g., determine, select, etc.) the expected data pattern and notify the target 104 of the expected data pattern. The initiator 102 generally presents the command 130 in response to a changing (e.g., incrementing) data pattern. The expected data pattern may be used in a comparison (to be described in connection with FIG. 4).

In one example, the expected data pattern may be implemented as a test data pattern that may be configured to test (e.g., stress) one or more hardware parameters (e.g., the initiator 102, the target 104, and/or the bus 106). However, the expected data pattern may be implemented as any appropriate data pattern to meet the design criteria of a particular application. The expected data pattern is generally stored in the target 104 (to be described in connection with FIG. 4). The system (or apparatus) 100 may implement a number of expected data pattern commands 130. Each of the commands 130 may have a corresponding expected data pattern.

Figure 2:
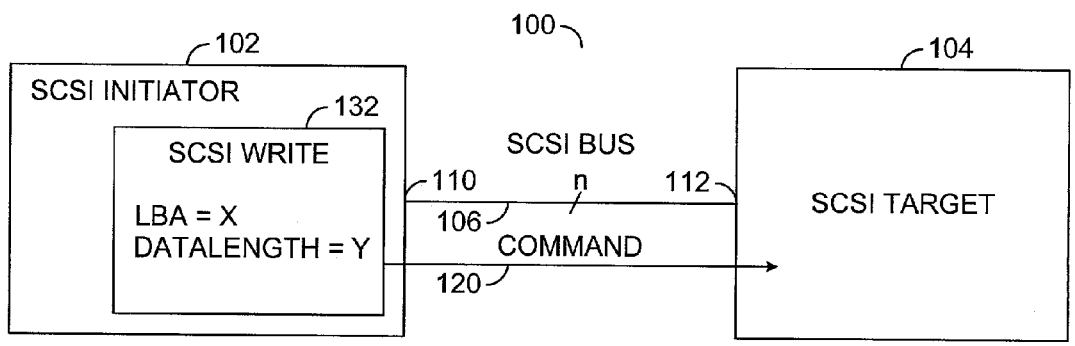
FIG. 2 is a diagram illustrating another step of the present invention.

Referring FIG. 2, an illustration of a step (e.g., Step 2) where the SCSI Initiator 102 generally sends a SCSI Block Write command 132 to the SCSI target 104 is shown. The command 132 may be sent in accordance with the SCSI specification. The SCSI Block Write command 132 generally comprises a number of fields that (i) define the Logic Block Address (LBA) within the target 104 where the sent data pattern is to be written (e.g., X) and (ii) the length (e.g., Y) of the data pattern. The target 104 generally stores the data pattern at the address indicated by the LBA X.

Figure 3:
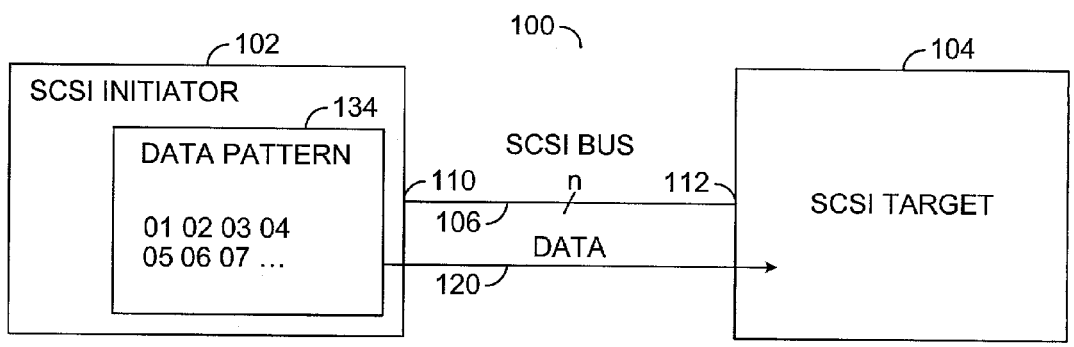
FIG. 3 is a diagram illustrating another step of the present invention.

Referring to FIG. 3, an illustration of a step (e.g., Step 3) where the SCSI initiator 102 generally sends a data pattern 134 in the data phase of the SCSI Block Write command 132 is shown. The sent data pattern 134 is generally implemented as the expected data pattern. The data pattern 134 may be presented to the target 104 through a number of lines within the bus 106 as a signal (e.g., DATA). The SCSI target 104 is generally configured to receive the data pattern 134.

Figure 4:
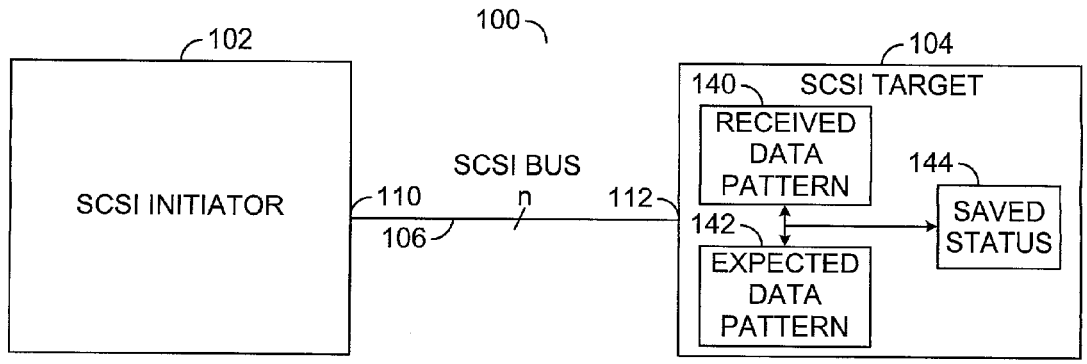
FIG. 4 is a diagram illustrating another step of the present invention.

Referring to FIG. 4, an illustration of a step (e.g., Step 4) where the SCSI target 104 compares a received and stored data pattern 140 with an expected data pattern 142 is shown. The SCSI target 104 generally writes (stores) the sent data pattern 134 to the respective storage medium at the location specified in the SCSI Write Block 132 command (e.g., the LBA X) as the received (and stored) data pattern 140.

The target circuit 104 may be configured to compare the received data pattern 140 and the expected data pattern 142 (e.g., the data pattern stored at the address LBA X referenced by the command 130). The target 104 may be configured to generate a saved status block 144. The saved status block 144 may be implemented as the results of the comparison of the data received (and stored) pattern 140 and the corresponding expected data pattern 142. The SCSI target 104 generally saves (stores) the status information (shown as the block 144). The status block 144 generally comprises information regarding the success of the comparison of the data received pattern 140 and the expected data pattern 142.

In one example, when the data received pattern 140 and the expected data pattern 142 match (e.g., the target 104 correctly received and/or stored the sent data pattern 134), the saved status block 144 may contain an indication (e.g., flag, signal, etc.) that indicates the comparison was accurate (correct). However, when the data received pattern 140 and the corresponding expected data pattern 142 do not match (e.g., the target 104 incorrectly received and/or stored the sent data pattern 134), the saved status block 144 generally contains an indicator that indicates that the comparison was not accurate (incorrect). The saved status block 144 may be configured to provide information (e.g., one or more fields) that indicate the address locations (e.g., actual and/or relative addresses) of the mis-matches between the received data pattern 140 and the expected data pattern 142. The saved status block 144 may aid the diagnosis and debugging of problems that are indicated when the data pattern 140 does not match the expected data pattern 142. The saved status block 144 is generally vendor unique (e.g., the status block 144 generally corresponds to the vendor unique command 130 and expected data pattern 134).

Figure 5:
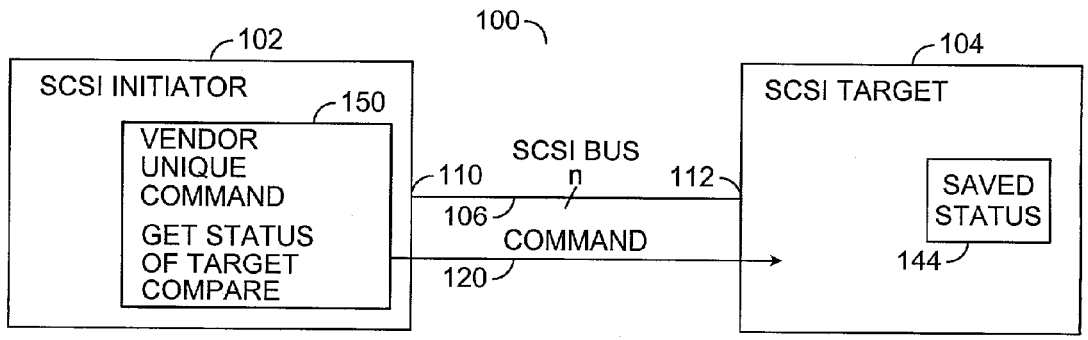
FIG. 5 is a diagram illustrating another step of the present invention.

Referring to FIG. 5, an illustration of a step (e.g., Step 5) where the SCSI initiator 102 sends (presents) a command 150 (e.g., a "get write status" command) to the target 104 to request (retrieve) the status of the target 104 compare (e.g., the status 144) is shown. The Vendor Unique Command 150 request for the saved status 144 information may be presented as the signal COMMAND.

Figure 6:
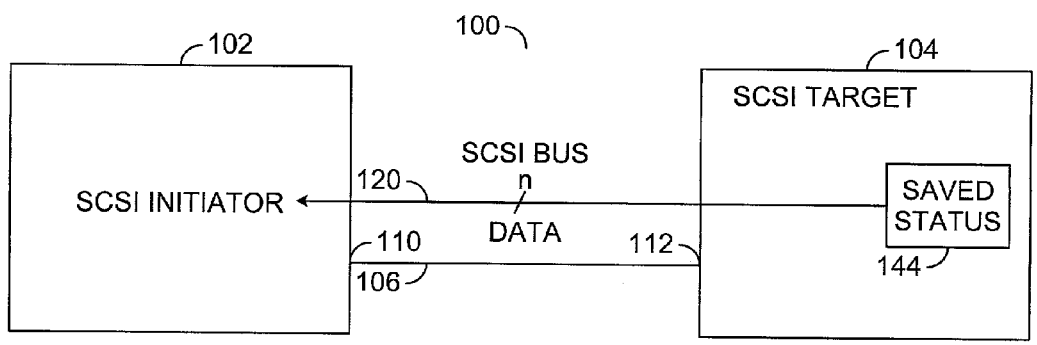
FIG. 6 is a diagram illustrating another step of the present invention.

Referring to FIG. 6, an illustration of a step (e.g., Step 6) where the SCSI target 104 sends (presents) the saved status information 144 as requested by the SCSI initiator 102 regarding the previous data comparison. The saved status information may be presented as the match/mismatch (correct/incorrect) indicator. When the stored data pattern 140 and the expected data pattern 142 do not match, the status block 144 information (e.g., the signal indicating a mismatch and/or the addresses and/or relative locations where mismatches occur) may be presented (transmitted) as the signal DATA.

Figure 7:
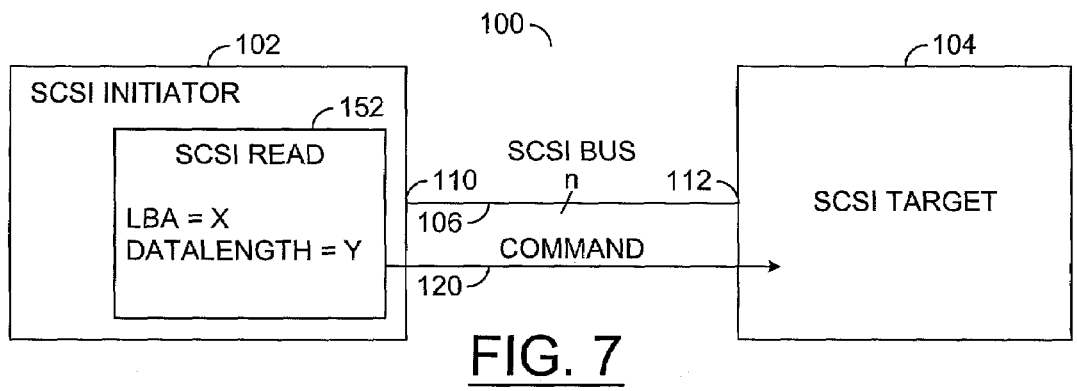
FIG. 7 is a diagram illustrating another step of the present invention.

Referring to FIG. 7, an illustration of a step (e.g., Step 7) where the SCSI initiator 102 interrupts (e.g., asserts an SP3 instruction to interrupt) the saved status 144 presented by the target 104 is shown. If the status 144 indicates a data miscompare between the data 140 and the data 142, the transfer of the SCSI initiator 102 may stop all I/O activity and flag (indicate) an error, so that the problem and/or problems may be diagnosed and debugged. The system 100 may be configured to perform the diagnosis and/or debug via any appropriate procedures, instruction sets, steps, routines, etc. to meet the design criteria of a particular application. If the status indicates the data comparison is good, the SCSI initiator 102 may be configured to assert (send) a SCSI Block Read command 152 (as the signal COMMAND) to the same LBA (e.g., the LBA X) of the target 104 and of the same data length (e.g., the data length Y) as the previous SCSI Block Write command (e.g., the command 132).

Figure 8:
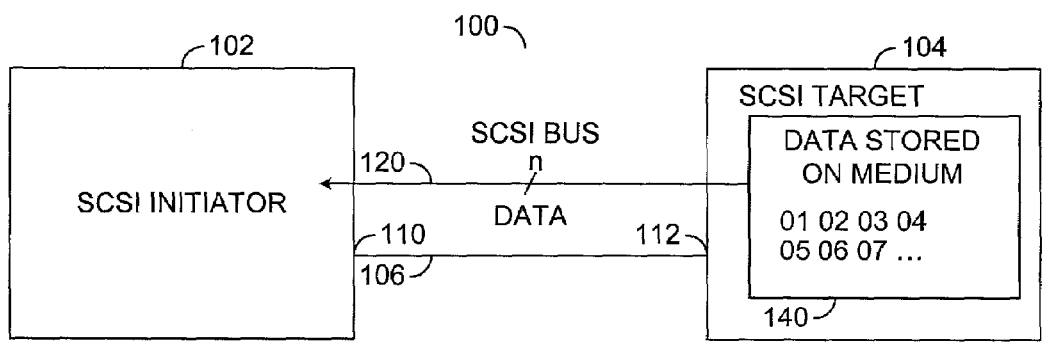
FIG. 8 is a diagram illustrating another step of the present invention.

Referring to FIG. 8, an illustration of a step (e.g., Step 8) where the SCSI target 104 sends the data pattern 140 that the was stored to the medium in the target 104 during the previous SCSI Block Write command 132 to the initiator 102. The data pattern 140 may be presented to the circuit 102 as the signal DATA during the data phase of the SCSI Block Read command 152. The initiator circuit 102 generally stores the received data pattern 140 as a received data pattern 154.

Figure 9:
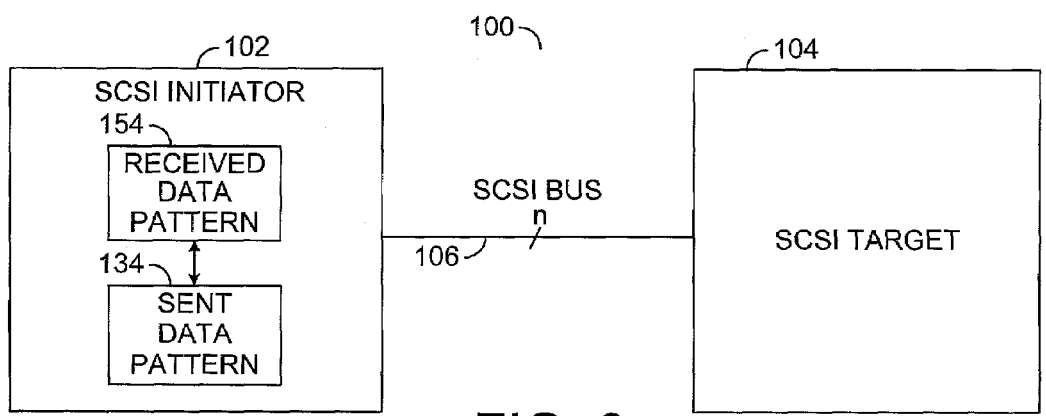
FIG. 9 is a diagram illustrating another step of the present invention.

Referring to FIG. 9, an illustration of a step (e.g., Step 9) where the SCSI initiator 102 generally compares the received data pattern 154 to the data pattern sent in the previous SCSI Block write command 132 (e.g., the data pattern 134). If the data accurately compares (e.g., when the received data pattern 154 matches the data pattern 134), the SCSI initiator 102 generally returns to step 2 and continues sending I/Os (e.g., command, data, etc.) via the SCSI Block write command 132, the data pattern 134, etc. until the SCSI initiator 102 changes the data pattern. When the initiator 102 changes data pattern, the system 100 may be configured to move to the Step 1 described in connection with FIG. 1.

If the data pattern 134 and the received (and stored) data pattern 154 do not successfully compare (e.g., a mis-match occurs), an error is generally flagged (indicated, signaled) and all I/O activity may be halted so that the problem and/or problems can be diagnosed and debugged (e.g., the system 100 may perform one or more of the diagnosis and/or debug procedures).

Control of the system (or apparatus) 100 may be implemented via software, firmware, and/or hardware (such as one or more state machines) or any combination thereof configured to perform the Steps 1–9 described above. The in-band data integrity diagnosis between the initiator 102 and the targets 104 of the present invention may provide significant savings in time, equipment, and/or personnel resources when compared to the conventional approaches. The present invention may provide superior validation of functionality of a SCSI protocol controller when compared to the conventional approaches.

While the invention has been particularly shown and described with reference to the preferred embodiments thereof, it will be understood by those skilled in the art that various changes in form and details may be made without departing from the spirit and scope of the invention. For example, protocols other than the SCSI protocol may be used with the present invention.

What is claimed is:

1. A method for data verification in a data storage environment comprising the steps of:
   (A) sending a command from an initiator to a target, wherein said command defines an expected data pattern;
   (B) sending a block write command from said initiator to said target, wherein said write command initiates sending data from said initiator to said target;
   (C) comparing data received to said expected data pattern;
   (D) sending a block read command from said initiator to said target, wherein said read command initiates sending said data received from said target to said initiator;
   (E) comparing said data received to said sent data; and
   (F) performing one or more debug procedures when data received does not match said sent data; and
   (G) generating a status indication in response to said step (E) comparison, wherein said status indication automatically differentiates between data errors occurring in said initiator and data errors occurring in said target.

2. The method according to claim 1, wherein said method further comprises the step of:
   sending a status request command from said initiator to said target, wherein said status request command initiates sending said status indication from said target to said initiator; and
   interrupting said status indication sending when said status indication indicates said data received does not match said expected data pattern.

3. The method according to claim 2, wherein said method further comprises the step performing one or more diagnosis and debug procedures in response to said status indication when said data received does not match said expected data pattern.

4. The method according to claim 1, wherein said method further comprises repeating steps (B)–(D) when said data received matches said expected data pattern.

5. The method according to claim 4, wherein said method further comprises repeating steps (A)–(D) in response to a changed data pattern.

6. The method according to claim 1, wherein said step (B) further comprises storing said data received in a medium in said target.

7. The method according to claim 1, wherein said block write command comprises a Small Computer Systems Interface (SCSI) block write command and said initiator sends said data to said target during a data phase of said SCSI block write command.

8. The method according to claim 1, wherein said initiator comprises a Small Computer Systems Interface (SCSI) initiator and said target comprises a SCSI target connected to said initiator through a SCSI bus.

9. The method according to claim 1, wherein said command comprises a Vendor Unique Command configured to notify said target of said expected data pattern.

10. An apparatus comprising:
    means for sending a command from an initiator to a target, wherein said command defines an expected data pattern;
    means for sending a block write command from said initiator to said target, wherein said write command initiates sending data from said initiator to said target;
    means for comparing data received to said expected data pattern;
    means for sending a block read command from said initiator to said target, wherein said read command initiates sending said data received from said target to said initiator;
    means for comparing said data received to said sent data; and
    means for performing one or more debug procedures when data received does not match said sent data; and
    means for generating a status indication in response to said comparison of said data, wherein said status indication automatically differentiates between data errors occurring in said initiator and data errors occurring in said target.

11. An apparatus comprising:
    an initiator circuit configured to send (i) a data pattern command configured to define an expected data pattern and (ii) a sent data pattern in response to a block write command; and
    a target circuit configured to (i) receive said sent data pattern, (ii) compare said data received pattern to said expected data pattern, (iii) generate a status indication in response to said comparison, (iv) send a block read command from said initiator to said target, wherein said read command initiates sending said data received from said target to said initiator, (v) compare said data received to said sent data, and (vi) perform one or more debug procedures when data received does not match said sent data, wherein said status indication automatically differentiates between data errors occurring in said initiator and data errors occurring in said target.

12. The apparatus according to claim 11, wherein said target circuit is configured to (i) store said status indication, (ii) present said status indication to said initiator circuit in response to a status request command, and (iii) when said data received pattern does not match said expected data pattern, said apparatus is configured to perform one or more diagnosis and debug procedures in response to said status indication.

13. The apparatus according to claim 11, wherein (i) said target circuit is configured to send said data received pattern to said initiator circuit in response to a read command, (ii) said initiator circuit is configured to compare said data received pattern to said sent data pattern, and (iii) when said data received pattern does not match said sent data pattern, said apparatus is configured to perform one or more diagnosis and debug procedures.

14. The apparatus according to claim 11, wherein said initiator circuit comprises a Small Computer Systems Interface (SCSI) initiator, said target circuit comprises a SCSI target, and said initiator circuit is connected to said target circuit through a SCSI bus.

15. The apparatus according to claim 11, wherein said initiator is configured to continue sending data in response to said block write command when said data received pattern matches said expected data pattern.

16. The apparatus according to claim 12, wherein said initiator is configured to interrupt said status indication sending when said data received pattern does not match said expected data pattern.

17. The apparatus according to claim 11, wherein said data pattern command comprises a Vendor Unique Command configured to notify said target circuit of said expected data pattern.

18. The apparatus according to claim 11, wherein said target circuit further comprises a medium configured to store said data received pattern.

19. The apparatus according to claim 11, wherein said block write command comprises a Small Computer Systems Interface (SCSI) block write command and said initiator circuit is configured to send said sent data pattern during a data phase of said SCSI block write command.

* * * * *